United States Patent
Gollapudi et al.

(10) Patent No.: US 9,483,559 B2
(45) Date of Patent: Nov. 1, 2016

(54) REFORMULATING QUERY TERMS IN STRUCTURED SEARCH

(71) Applicant: Microsoft Corporation, Redmond, WA (US)

(72) Inventors: Sreenivas Gollapudi, Cupertino, CA (US); Samuel Ieong, Mountain View, CA (US); Anitha Kannan, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 276 days.

(21) Appl. No.: 13/786,474

(22) Filed: Mar. 6, 2013

(65) Prior Publication Data

US 2014/0258303 A1    Sep. 11, 2014

(51) Int. Cl.
*G06F 17/30* (2006.01)

(52) U.S. Cl.
CPC .............. *G06F 17/30864* (2013.01)

(58) Field of Classification Search
CPC .............. G06F 17/30864; G06F 17/30867
See application file for complete search history.

(56) References Cited

U.S. PATENT DOCUMENTS

| | | | |
|---|---|---|---|
| 2003/0212673 A1* | 11/2003 | Kadayam | G06F 17/30864 |
| 2004/0205516 A1* | 10/2004 | Tufts | 715/501.1 |
| 2011/0087678 A1* | 4/2011 | Frieden | G06F 17/30867 707/749 |
| 2011/0145226 A1* | 6/2011 | Gollapudi et al. | 707/723 |
| 2011/0145227 A1* | 6/2011 | Kenthapadi | G06F 17/30867 707/723 |
| 2011/0184893 A1* | 7/2011 | Paparizos et al. | 706/12 |
| 2012/0005148 A1* | 1/2012 | Horvitz et al. | 706/50 |
| 2012/0005219 A1* | 1/2012 | Apacible et al. | 707/768 |
| 2012/0265779 A1 | 10/2012 | Hsu et al. | |

OTHER PUBLICATIONS

Gollapudi, et al., "Structured Query Reformulations in Commerce Search", Retrieved at <<http://arxiv.org/pdf/1208.2478.pdf>> 21st ACM International conference on Information and knowledge management, Oct. 29, 2012, pp. 10.

Parikh, et al., "Inferring Semantic Query Relations from Collective User Behavior", retrieved at <<http://www.ics.uci.edu/~smyth/courses/cs277/papers/ebay_query_analysis_CIKM08.pdf>> In the proceedings of 17th ACM conference on Information and knowledge management, Oct. 26, 2008, pp. 10.

Asfari, et al., "A Context-based Model for Web Query Reformulation", Retrieved at <<http://perso.limsi.fr/jps/research/daft/doc/10.A_KDIR-ounas.25oct10.pdf>> Oct. 25, 2010, pp. 6.

(Continued)

*Primary Examiner* — Shiow-Jy Fan
(74) *Attorney, Agent, or Firm* — Dave Ream; Tom Wong; Micky Minhas

(57) ABSTRACT

Search history data such as browse trails are collected over time. The browse trails, including associated queries and domains, are processed to identify free tokens of the queries that are also modifiers. Attribute value pairs of a structured data source that correspond to the modifiers are determined based on the search history data and a frequency of the attribute value pairs in the structured data source. When a subsequent query is received, modifiers in the query are identified and replaced with the determined combinations of attribute value pairs that correspond to the modifiers in a structured query that is generated from the received query. The structured query is used to identify items and/or services in the structured data source that are responsive to the received query.

18 Claims, 5 Drawing Sheets

(56) References Cited

OTHER PUBLICATIONS

Asfari, et al., "Improving User Query processing Based on User Profile and Task Context", Retrieved at <<http://perso.limsi.fr/jps/research/daft/doc/10.A_.SWWS-ounas12jul10.pdf>> Jul. 12, 2010, pp. 7.
Yao, et al., "Keyword Query Reformulation on structured Data", Retrieved at <<http://ieeexplore.ieee.org/stamp/stamp.jsp?tp=&arnumber=6228147>> Proceedings: 2012 IEEE 28th International Conference on Data Engineering (ICDE), Apr. 1, 2012, pp. 12.
Geist, et al., "Query Reformulation for Keyword Searching in Mediator Systems", Retrieved at <<http://wwwiti.cs.uni-magdeburg.de/iti_db/publikationen/ps/03/preprint_keyword.pdf>> Retrieved Date: Dec. 19, 2012, pp. 25.
Agrawal, et al., "Exploiting Web Search Engines to Search Structured Databases", Retrieved at <<http://www.wwwconference.org/www2009/proceedings/pdf/p501.pdf>>, Proceedings: 18th International World Wide Web Conference, Apr. 20, 2009, pp. 10.
Chaudhuri, et al., "Exploiting Web Search to Generate Synonyms for Entities", Retrieved at <<http://www.ra.ethz.ch/cdstore/www2009/proc/docs/p151.pdf>> In the proceedings 18th international conference on World wide web, Apr. 20, 2009, pp. 10.
Elbassuoni, et al., "Query Relaxation for Entity-Relationship Search", retrieved at <<http://www.mpi-inf.mpg.de/~elbass/downloads/elbasseswc2011.pdf>> Proceedings: ESWC'11 Proceedings of the 8th extended semantic web conference on The semantic web: research and applications—Volume Part II, Jun. 2011, pp. 15.
Li, et al., "Extracting Structured Information from User Queries with Semi-Supervised Conditional Random Fields", Retrieved at <<http://research.microsoft.com/pubs/80243/fp275-li.pdf>> Proceedings: 32nd international ACM SIGIR conference on Research and development in information retrieval, Jul. 19, 2009 pp. 8.
Sarkas, et al., "Structured Annotations of Web Queries", Retrieved at <<http://www.cs.uoi.gr/~tsap/publications/annotations.pdf>> Proceedings: ACM SIGMOD International Conference on Management of data, Jun. 6, 2010, pp. 12.
"ComScore Reports $44.3 Billion in Q1 2012 U.S. Retail E-Commerce Spending, Up 17 Percent vs. Year Ago", Retrieved at <<http://www.comscore.com/Press_Events/Press_Releases/2012/5comScore_Reports_44.3_Billion_in_Q1_2012_U.S._Retail_E-Commerce_Spending>> May 9, 2012, pp. 2.
Agrawal, et al., "Fast algorithms for mining association rules in large databases", retrieved at <<http://cc.usst.edu.cn/Download/39155d41-2fd6-461a-89e0-1e2a4e9bceb6.pdf>> In Proceedings of the 20th International Conference on Very Large Data Bases, Dec. 9, 1994, pp. 13.
Agrawal, et al., "DBXplorer: A System for Keyboard-Based Search Over Relational Databases", Retrieved at <<http://ieeexplore.ieee.org/stamp/stamp.jsp?tp=&arnumber=994693>> In Proceedings of 18th International Conference on Data Engineering, Feb. 26, 2002, pp. 12.
Bilenko, et al., "Mining the Search Trails of Surfing Crowds: Identifying Relevant Websites from User Activity", Retrieved at <<http://www.ra.ethz.ch/CDStore/www2008/www2008.org/papers/pdf/p51-bilenko-pdf>> In Proceedings of the 17th International Conference on World Wide Web, Apr. 21, 2008, pp. 10.
Ding, et al., "Efficient Keyword-Based Search for Top-k Cells in Text Cube", Retrieved at <<http://ieeexplore.ieee.org/stamp/stamp.jsp?tp=&arnumber=5710919>> In IEEE Transactions on Knowledge and Data Engineering, vol. 23, Issue 12, Dec. 2011, pp. 16.
Gollapudi, et al., "Efficient Query Rewrite for Structured Web Queries", Retrieved at <<http://arxiv.org/pdf/1108.2685.pdf>> In Proceedings of the 20th ACM International Conference on Information and Knowledge Management, Oct. 24, 2011, pp. 10.
Guo, et al., "XRANK: Ranked Keyword Search over XML Documents", Retrieved at <<http://www.cs.cornell.edu/~cbotev/XRank.pdf>> In Proceedings of the ACM SIGMOD International Conference on Management of Data, Jun. 9, 2003, pp. 12.
Hristidis, et al., "Efficient IR-Style Keyword Search over Relational Databases", Retrieved at <<http://www.vldb.org/conf/2003/papers/S25P03.pdf>> In Proceedings of the 29th International Conference on Very Large Data Bases, vol. 29, Sep. 9, 2003, pp. 12.
Hristidis, et al., "Keyword Search in Relational Databases", Retrieved at <<http://db.ucsd.edu/pubsFileFolder/145.pdf>> In Proceedings of the 28thVLDB Conference, Aug. 20, 2002, pp. 12.
Koutrika, et al., "CourseCloud: Summarizing and Refining Keyword Searches over Structured Data", Retrieved at <<http://www.edbt.org/Proceedings/2009-StPetersburg/edbt/papers/p1132-Koutrika.pdf>> In Proceedings of the 12th International Conference on Extending Database Technology: Advances in Database Technology, Mar. 24, 2009, pp. 4.
Koutrika, et al., "Data Clouds: Summarizing Keyword Search Results over Structured Data", Retrieved at <<http://icdt.tu-dortmund.de/proceedings/edbticdt2009proc/edbt/papers/p0391-Koutrika.pdf>> In Proceedings of the 12th International Conference on Extending Database Technology: Advances in Database Technology, Mar. 24, 2009, pp. 12.
Lin, et al., "Text Cube: Computing IR Measures for Multidimensional Text Database Analysis", Retrieved at <<http://ieeexplore.ieee.org/stamp/stamp.jsp?tp=&arnumber=4781199>> Dec. 15, 2008, In Eighth IEEE International Conference on Data Mining, Dec. 15, 2008, pp. 6.
Liu, et al., "Effective Keyword Search in Relational Databases", Retrieved at <<http://cs.binghamton.edu/~meng/pub.d/Sigmod06_Keyword.pdf>> In Proceedings of the ACM SIGMOD International Conference on Management of Data, Jun. 27, 2006, pp. 12.
Luo, et al., "Spark: Top- k Keyword Query in Relational Databases", Retrieved at <<http://itee.uq.edu.au/~zxf/_papers/SIGMOD07.pdf>> In Proceedings of the ACM SIGMOD International Conference on Management of Data, Jun. 11, 2007, pp. 12.
Panigrahi , et al., "Result Enrichment in Commerce Search Using Browse Trails", retrieved at <<http://sreenivasgollapudi.com/pubs/wsdm2011a.pdf>> In Proceedings of the Fourth ACM International Conference on Web Search and Data Mining, Feb. 9, 2011, pp. 10.
White, et al., "Investigating Behavioral Variability in Web Search", Retrieved at <<http://wwwconference.org/www2007/papers/paper535.pdf>> In Proceedings of the 16th International Conference on World Wide Web, May 8, 2007, pp. 10.
Ganti, et al., "Keyword++: A Framework to Improve Keyword Search over Entity Databases", Retrieved at <<http://pages.cs.wisc.edu/~heyeye/paper/Keyword++.pdf>> In Journal of Proceedings of the VLDB Endowment , vol. 3, Issue 1-2, Sep. 2010, pp. 12.

\* cited by examiner

REFORMULATING QUERY TERMS IN STRUCTURED SEARCH

BACKGROUND

There has been tremendous growth in the amount of commerce conducted over the web in the past decade. Most online transactions begin with search, both in dedicated e-commerce sites (e.g., Amazon™) and in search engine verticals (e.g., Bing™ or Google™ shopping). However, there are many characteristics that differentiate commerce search from web search. While web search is predominantly performed over unstructured data such as contents of web pages, commerce search is performed over structured data in the form of a catalog. The rich semantics in the structured catalog, when leveraged, enables effective query analysis and ranking. In particular, keywords queries annotated with type semantics enables effective retrieval from structured data sources.

However, not all commerce queries can be annotated with such clean semantics. For example, consider the query "designer hand-bags". There is no explicit type semantics that can be associated with the term "designer" based on the catalog. Due to a possible lack of domain knowledge, users often express their information need using combinations of keywords, some of which may be easily typed to an explicit semantic type and others that cannot be easily typed. The former are referred to as typed tokens and the latter are referred to as free tokens.

One solution is to treat free tokens as keywords, and to perform keyword searches using the free tokens over the available unstructured data such as product descriptions and user reviews associated with the catalog. There are several drawbacks to this solution. First, these sources could be noisy—a seller may have incentives to label the handbags he sells with positive terms such as "designer" and "stylish" to boost sales. Second, the information can be dated—a handbag that is considered designer a year ago may become blasé today. Finally, it can adversely affect recall, if the free token is rare and/or not mentioned in the unstructured data.

SUMMARY

A class of free tokens called modifiers is identified. The modifiers in a received query are replaced with combination of attribute value pairs based on the search history of users.

In an implementation, search history data such as browse trails are collected over time. The browse trails, including associated queries and domains, are processed to identify free tokens of the queries that are also modifiers. Attribute value pairs of a structured data source that correspond to the modifiers are determined based on the search history data and a frequency of the attribute value pairs in the structured data source. When a subsequent query is received, modifiers in the query are identified and replaced with the determined combination of attribute value pairs that correspond to the modifiers in a structured query that is generated from the received query. The structured query is used to identify items and/or services in the structured data source that are responsive to the received query.

In an implementation, a query is received at a computing device through a network. The query comprises a plurality of terms and is associated with a category. A first subset of terms of the plurality of terms that match one or more attribute value pairs from structured data associated with the category is determined by the computing device. A second subset of terms of the plurality of terms that do not match any attribute value pairs from the structured data associated with the category is determined by the computing device. One or more terms of the second subset of terms that are modifiers for the category are determined by the computing device. For each of the determined modifiers, one or more attribute value pairs for the modifier are determined by the computing device. A structured query is generated by the computing device using the one or more attribute value pairs that match the terms of the first subset of terms and the one or more attribute value pairs determined for each modifier. One or more items that match the structured query are determined by the computing device. A subset of the one or more identified items is presented by the computing device through the network.

In an implementation, structured data is received by a computing device. The structured data includes a plurality of attribute value pairs. Search history data is received by the computing device. The search history data comprises a plurality of queries, and each query comprises a plurality of terms and is associated with a category of a plurality of categories. Terms of the plurality of terms that do not match any attribute value pairs of the structured data are determined by the computing device. For each category, modifiers for the category are determined using the search history data and the terms of the plurality of terms that do not match any attribute value pairs by the computing device. For each modifier, a conditional probability for each attribute value pair of the structured data is determined for the modifier using the search history data by the computing device. One or more attribute value pairs of the structured data are selected for each modifier by the computing device based on the determined conditional probabilities.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
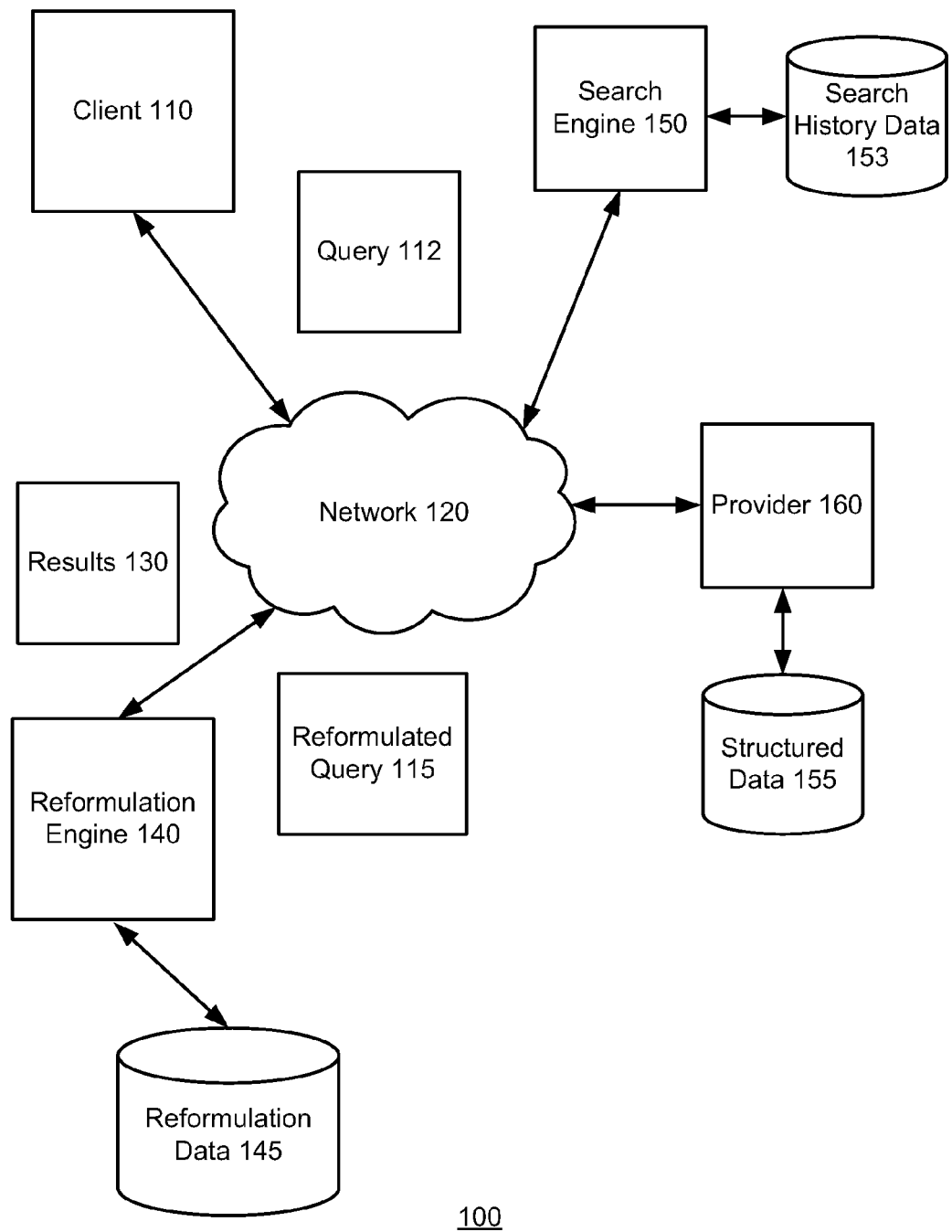
FIG. 1 is an illustration of an exemplary environment for providing and determining reformulated queries.

FIG. 1 is an illustration of an exemplary environment 100 for reformulating queries. A client 110 may communicate with a search engine 150 or a provider 160 through a network 120. The client 110 may be configured to communicate with the search engine 150 and/or provider 160 to access, receive, retrieve, and display media content and other information such as web pages and web sites. The network 120 may be a variety of network types including the public switched telephone network (PSTN), a cellular telephone network, and a packet switched network (e.g., the Internet). Although one search engine 150 and one provider 160 is shown in FIG. 1, it is contemplated that the client 110 may be configured to communicate with multiple search engines 150 and/or providers 160 through the network 120.

In some implementations, the client 110 may include a desktop personal computer, workstation, laptop, personal digital assistant (PDA), cell phone, or any WAP-enabled device or any other computing device capable of interfacing directly or indirectly with the network 120. The client 110 may be implemented using one or more computing devices such as the computing system 500 illustrated in FIG. 5. The client 110 may run an HTTP client, e.g., a browsing program, such as MICROSOFT INTERNET EXPLORER or other browser, or a WAP-enabled browser in the case of a cell phone, PDA, or other wireless device, or the like, allowing a user of the client 110 to access, process, and view information and pages available to it from the search engine 150 or the provider 160.

The search engine 150 may be configured to provide data relevant to one or more queries 112 received from users using devices such as the client 110. The search engine 150 may store each received query 112, and indicators of one or more domains or web sites subsequently visited by the users that provided the queries 112 as search history data 153. In some implementations, the information stored in the search history data 153 may include one or more browse trails. A browse trail may comprise a sequence of domains or web sites visited by a user after submitting a query 112. Other types of data may be stored by the search history data 153. In addition, the search history data 153 may be supplemented by data collected by web browsing applications associated with the client 110.

The provider 160 may be a server hosting a web site that allows users to search for and view items and services. For example, the provider 160 may host a web site of a camera retailer and users may browse and search for cameras available for sale by providing queries 112 to the provider 160 and receiving listings of matching items from the provider 160 in response to the query 112. Other types of retailers, for example, may also be associated with the provider 160.

In some implementations, the provider 160 may access and store structured data 155. The structured data 155 may include various attributes associated with each item or service offered by the provider 160. Each attribute may have one or more associated values. An attribute and its corresponding value are referred to herein as an attribute value pair. In addition, the search engine 150 may access structured data 155 for one or more providers 160. In some implementations, the search engine 150 may access the structured data 155 stored at the provider 160, or may alternatively be provided a copy of the structured data 155 that may then be stored locally at the search engine 150.

In some implementations, the structured data 155 may be implemented using a plurality of data structures such as tables. Each table of structured data 155 may correspond to a different category or type of item or service. For example, a provider 160 may be a shoe retailer and each shoe may have one or more attributes that describe the qualities and characteristics of the shoe. Typical attributes associated with the shoe may include "color", "size", "brand", "width", "style", "price", etc.

Further, each shoe may have one or more values associated with one or more of the attributes. Because every attribute may not be applicable to each shoe, each attribute may not have a corresponding value for each product. An table for four shoes is shown as Table 1:

TABLE 1

| SHOE ID | TYPE | COLOR | SIZES | PRICE | BRAND |
|---|---|---|---|---|---|
| 1 | SHOE | RED | W7-12 | $300 | Gucci |
| 2 | BOOT | BLACK | M8-15 | $250 | Prada |
| 3 | SHOE | BLUE | M8-12 | $50 | Nike |
| 4 | SHOE | GREEN | W6-9 | $50 | Adidas |

Typically, when a user at a client 110 wants to purchase or locate an item or service, the user may generate a query 112 that corresponds to the item and may provide the query 112 to the search engine 150 or directly to the provider 160. For example, a user may want to find boots matching the query 112 "fashion boots". The user may provide the query 112 "fashion boots" to the search engine 150. The search engine 150 and/or the provider 160 may then attempt to translate the terms of the query 112 into attribute values pairs that correspond to a category associated with the query 112.

Thus, continuing the "fashion boots" example, the search engine 150 and/or the provider 160 may attempt to match the terms of the query 112 with attribute value pairs of structured data 155 that is related to the categories shoes, clothing, or boots. The process of matching terms of a query 112 with attribute value pairs of a category of structured data 155 is known as tokenization.

Using the data from the Table 1, the term "boot" of the query 112 matches the attribute value pair of [TYPE: BOOT]. However, the term "fashion" does not match any attribute value pairs, even though the user who submitted the query 112 may have had a particular attribute value pair in mind for the term "fashion" such as [BRAND: GUCCI] or [BRAND:PRADA]. An unmatched term is referred as an unmatched or free token, and a matched term is referred to as a matched or typed token.

To overcome the problem of free tokens, the environment 100 may further include a reformulation engine 140. The reformulation engine 140 may generate a reformulated query 115 from a received query 112 by replacing some or all of the free tokens or unmatched terms of the query 112 with attribute value pairs that have been determined to be modifiers for the category associated with the received query 112. Thus, for example, for a query 112 related to the category of shoes, the free token "fashion" may be replaced with the attribute values [BRAND: GUCCI] or [BRAND: PRADA]. As may be appreciated, the category of the query 112 may be used to select the attribute value pairs used to replace the modifier. For example, the free token "high-end" may have completely different meanings with respect to different categories such as automobiles, audio equipment, and clothing.

The reformulation engine 140 may generate the reformulated query 115 by combining the typed tokens of the query 112 with the one or more attribute value pairs determined for the one or more free tokens that are modifiers from the query 112. The reformulated query 115 may be used by the search engine 150 and/or the provider 160 to generate results 130 using the structured data 155. The results 130 may comprise a web page and may include a listing of items or services in the structured data 155 that match the reformulated query 115. The items may include consumer products and services, for example.

Figure 2:
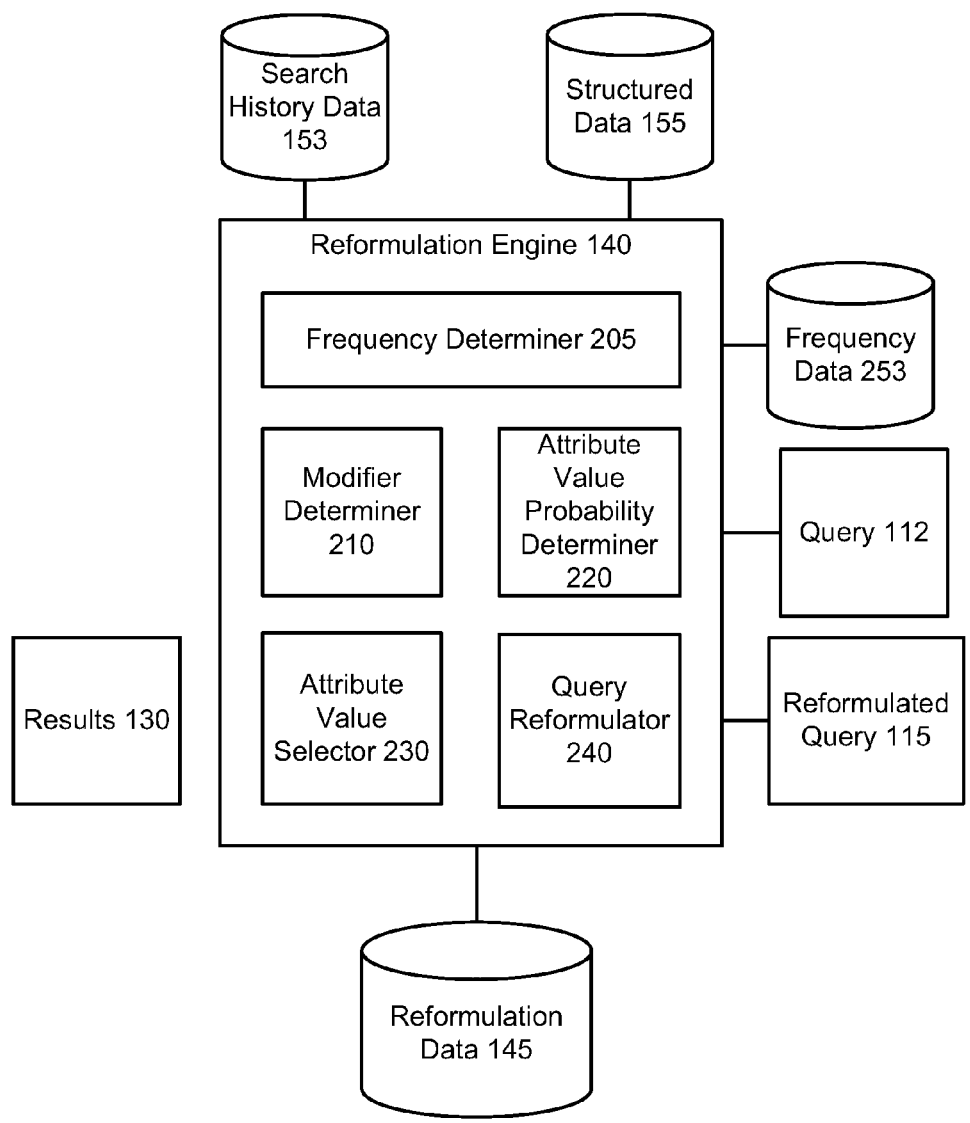
FIG. 2 is an illustration of an implementation of a system comprising an exemplary reformulation engine.

As discussed further with respect to FIG. 2, the reformulation engine 140 may generate the reformulated query 115 using reformulation data 145. The reformulation data 145, for each category, may identify which free tokens are modifiers for the category. Which free tokens are modifiers may be determined by the reformulation engine 140 based on the browse trails of the search history data 153.

The reformulation data 145 may further include conditional probabilities for each attribute pair of the structured data 155 with respect to each modifier. The conditional probabilities may be used by the reformulation engine 140 to select attribute values to use to replace the modifiers when generating a reformulated query 115. The reformulation engine 140 may further consider the frequencies of the attribute value pairs in the structured data 155 when selecting the attribute values to replace the modifiers. The conditional probabilities may be determined by the reformulation data 145 using the browse trails of the search data 153.

FIG. 2 is an illustration of an implementation of an exemplary reformulation engine 140. The reformulation engine 140 may include several components including, but not limited to, a frequency determiner 205, a modifier determiner 210, an attribute value probability determiner 220, an attribute value selector 230, and a query reformulator 240. More or fewer components may be supported. The reformulation engine 140 may be implemented using one or more computing devices such as the computing system 500 illustrated in FIG. 5.

The frequency determiner 205 may process the search history data 153 to generate frequency data 253. As described above, the search history data 153 may include browse trails, and each browse trail may include a query 112 submitted by a user and a sequence of domains and/or web pages that were visited by the user during a search session. Initially, the frequency determiner 205 may process the queries 112 associated with the search history data 153 to determine each token that is part of the queries 112. Each token may correspond to a term of a query 112. Any method or technique known in the art for tokenizing queries 112 may be used.

The frequency determiner 205 may generate a frequency count for each token and domain pair from the search history data 153 that is a count of how often a query 112 having the token was part of a browse trail that included the domain. The frequency counts may be determined by the frequency determiner 205 using an algorithm such as the known "heavy hitter" algorithm. Other algorithms may be used. The frequency counts may be stored by the frequency determiner 205 as the frequency data 253.

The modifier determiner 210 may determine modifiers for each of a plurality of categories of structured data 155. Initially, the modifier determiner 210 may determine free tokens (i.e., query terms that do not match attribute value pairs of the structured data 155) from the tokens of the frequency data 253. The modifier determiner 210 may identify free tokens using any one of a variety of known methods or techniques for query tokenization.

A free token may be considered a modifier if the user intended the token to distinguish the types of items or services the user had in mind when generating the query 112. For example, in the query 112 "fancy restaurant", the token "fancy" is a modifier for restaurant because the user may intend the token "fancy" to restrict the search for restaurants to those having a high price and a specific ambiance.

The modifier determiner 210 may identify those free tokens that are modifiers using the frequency data 253. In particular, in some implementations, the modifier determiner 210 may use the frequency data 253 to determine the number of domains that are associated with each free token. Those free tokens that are concentrated over a few domains may be considered modifiers.

In some implementations, the modifier determiner 210 may identify modifiers from free tokens using the following "importance" function imp(f) where f is a free token of all of the identified free tokens F, and df(f) is the number of domains D where the free token f has a non-zero weight (i.e., was associated with a domain in the frequency data 253):

$$imp(f) = \sum_{d \in D} P(f \mid d) \log\left(\frac{|D|}{1.0 + df(f)}\right)$$

The modifier determiner 210 may identify the modifiers from the free tokens based on the importance scores calculated for each free token. In particular, in some implementations, the modifier determiner 210 may, for each category, select the free tokens associated with that category that have the highest importance score. For example, the modifier determiner 210 may select the free tokens having the top ten importance scores for a category as the modifiers for that category. Other numbers of modifiers may be selected for each category. The identified modifiers for each category may be stored by the modifier determiner 210 as part of the reformulation data 145.

The attribute value probability determiner 220 may determine a conditional probability of each attribute value pair given each modifier. The attribute value probability determiner 220 may determine the conditional probabilities using the frequency data 253 and/or the search history data 153. The conditional probability for an attribute value pair given a modifier is also known as an association score.

The attribute value probability determiner 210 may determine the joint distribution (P(a, v), m, d)) of each attribute value pair (a, v), modifier m, and domain d as:

$$P((a,v),m,d) = P(d)P(a|d)P(v|a,d)P(m|d)$$

The particular values of P(d), P(a|d), P(v|a, d), and P(m|d) may be calculated based on the determined frequency data 253. For example, P(d) may be calculated based on the number of total number of frequency counts of tokens with the domain d. Similarly, P(a|d) may be calculated based on the number of frequency counts of tokens that are associated with both the attribute a and the domain d.

By marginalizing the joint distribution with respect to the domains in the above formula the following formula for the joint distribution is obtained:

$$P((a, v), m) = \sum_{d} P(d)P(a \mid d)P(v \mid a, d)P(m \mid d)$$

The attribute value probability determiner 220 may then determine the association score of an attribute value pair given a modifier m as:

$$P((a, v) \mid m) = \frac{P((a, v), m)}{\sum_{m' \in M} P((a, v), m')}$$

The attribute value probability determiner 220 may calculate the association score for each attribute value pair with respect to each modifier identified by the modifier determiner 210. The calculated association scores may be stored by the attribute value probability determiner 220 as part of the reformulation data 145.

The attribute value selector 230 may select one or more attribute value pairs for each of the determined modifiers. In some implementations, the attribute value selector 230 may select the attribute value pairs for a modifier based on the association scores associated with the attribute value pairs with respect to the modifier. For example, the attribute value selector 230 may select any attribute value pairs for a modifier that have an association score that is higher than a threshold association score. The attribute value pairs selected for each modifier may be stored by the attribute value selector 230 as part of the reformulation data 145.

In other implementations, the attribute value selector 230 may select attribute value pairs for a modifier based on the association scores, and also based on frequencies of the attribute value pairs in the structured data 155. The attribute value selector 230 may weight the association score of an attribute value pair based on the frequency of the attribute value pair in the structured data 155. An attribute value pair with a high frequency in the structured data 155 may receive a greater weight than an attribute value pair with a low frequency in the structured data 155. The attribute value selector 230 may the select attribute value pairs for a modifier that have a weighted association score that is higher than the threshold association score.

In some implementations, the attribute value selector 230 may select attribute values for a modifier by determining coverage scores for sets of attribute value pairs with respect to the modifier and selecting the set of attribute values with the highest determined coverage score for the modifier. The coverage score may be determined using a combination of the association scores and the frequencies of the attribute value pairs in the structured data 155. The calculation of coverage scores is described in greater detail below.

The set of attribute value pairs with association scores may be denoted as $C=\{(a_i, v_i, s_i)\}$ for i=1 to n, where a is an attribute, v is a value, and s is the association score for the attribute value pair a,v. A weight function w that maps an item p of the structured data 155 to an association score is given as:

$$w(p = \{(a_i, v_i)\}_{i=1}^k) = \sum_{(a,v,s) \in C \text{ and } (a,v) \in p} \frac{s}{|\text{Products}(\{(a, v)\})|}$$

The coverage score S of a set of attribute value pairs $S=\{(a_i, v_i)\}$ from i=1 with respect to attribute value pairs with association scores C and importance values of attributes $z:A \rightarrow R+$ equals C(S). C(S) in turn equals w(S)z(S), where:

$$w(S) = \frac{\sum_{p \in P(S)} w(p)}{\sum_{p \in P} w(p)} \text{ and } z(S) = \frac{\sum_{a:(a,*) \in S} z(a)}{\sum_{a \in A} z(a)}.$$

W(S) may be interpreted as the fraction of weights that the items from the structured data 155 that satisfy S cover among all of the items in the structured data 155. Z(S) may be interpreted as the relative importance of the attributes covered in S. The importance values z associated with the attributes in the structured data 155 may be specified by a user or administrator.

The attribute value selector 230 may select the set of attribute value pairs with the highest coverage score for each modifier using the following algorithm. The algorithm takes as an input a set $C=\{(a_i, v_i, s_i)\}_{i=1}^m$ of attribute value pairs $(a_i, v_i)$ with association scores $s_i$, structured data 155 P, and importance scores values of attributes z. The algorithm outputs a set $L=\{(S_j, c_i)\}_{i=1}^m$ of sets of attribute value pairs $S_j$ with coverage scores $c_i$. The algorithm is shown below using pseudo code, where the function FINDITEMSET can be any frequent item set mining algorithm that can accept weights, such as a priori.

```
P" ← 0, W ← 0;
foreach (a_i, v_i, s_i) ∈ C do
    P" ← Products({(a_i, v_i)});
    foreach item p ∈ P'do
        Add p to database P";
        w[p] ← w[p] + s_i/|P'|;
    end
    W ← W + s_i;
end
L ← 0;
for θ ∈ (0, 1) do
    L' ← FINDITEMSET(P", w, θW);
    foreach S ∈ L' do
        w(S) ← ∑_{p∈P(S)} w[p], z(S) ← ∑_{a:(a_i,*)∈S} z(a);
        c ← w(S) × z(S);
        Add(S, c) to L;
    end
end
return L;
```

The query reformulator 240 may receive a query 112 and may reformulate the query 112 into a reformulated query 115. When the query reformulator 240 receives a query 112, the query reformulator 240 may identify typed tokens among the terms of the query 112. The query reformulator 240 may identify the typed tokens by matching the terms of the query with attribute value pairs of the structured data 155 associated with the category of the query 112. Any method or technique for query tokenization may be used.

After identifying the typed tokens, the query reformulator 240 may identify free tokens among the terms of the received query 112. The free tokens may be those terms that do not match any attribute value pairs of the structured data 155 associated with the category of the query 112.

The query reformulator 240 may determine the free tokens of the query 112 that are also modifiers. The modifier determiner 210 previously determined modifiers for each category and stored the modifiers with the reformulation data 145. The query reformulator 240 may determine the free tokens of the query 112 that are modifiers by matching the determined free tokens against the determined modifiers in the reformulation data 145 for the category associated with the query 112.

The query reformulator 240 may generate the reformulated query 115 using the typed tokens and the determined modifiers. In particular, the query reformulator 240 may retrieve the one or more attribute values that were determined for each of the modifiers by the attribute value selector 230 from the reformulation data 145. The query reformulator 240 may generate a structured query using the typed tokens and the retrieved one or more attribute values for each modifier. The generated structured query may be provided by the query reformulator 240 as the reformulated query 115.

The reformulation engine 140 may provide the reformulated query 115 to one or both of the search engine 150 and the provider 160. The search engine 150 and/or the provider 160 may determine items from the structured data 155 that match the reformulated query 115. Indicators of one or more of the matching items may be provided to the client 110 that provided the query 112 as the results 130. Alternatively, the reformulation engine 140 may determine the matching items, and may provide the results 130 to the client 110.

Figure 3:
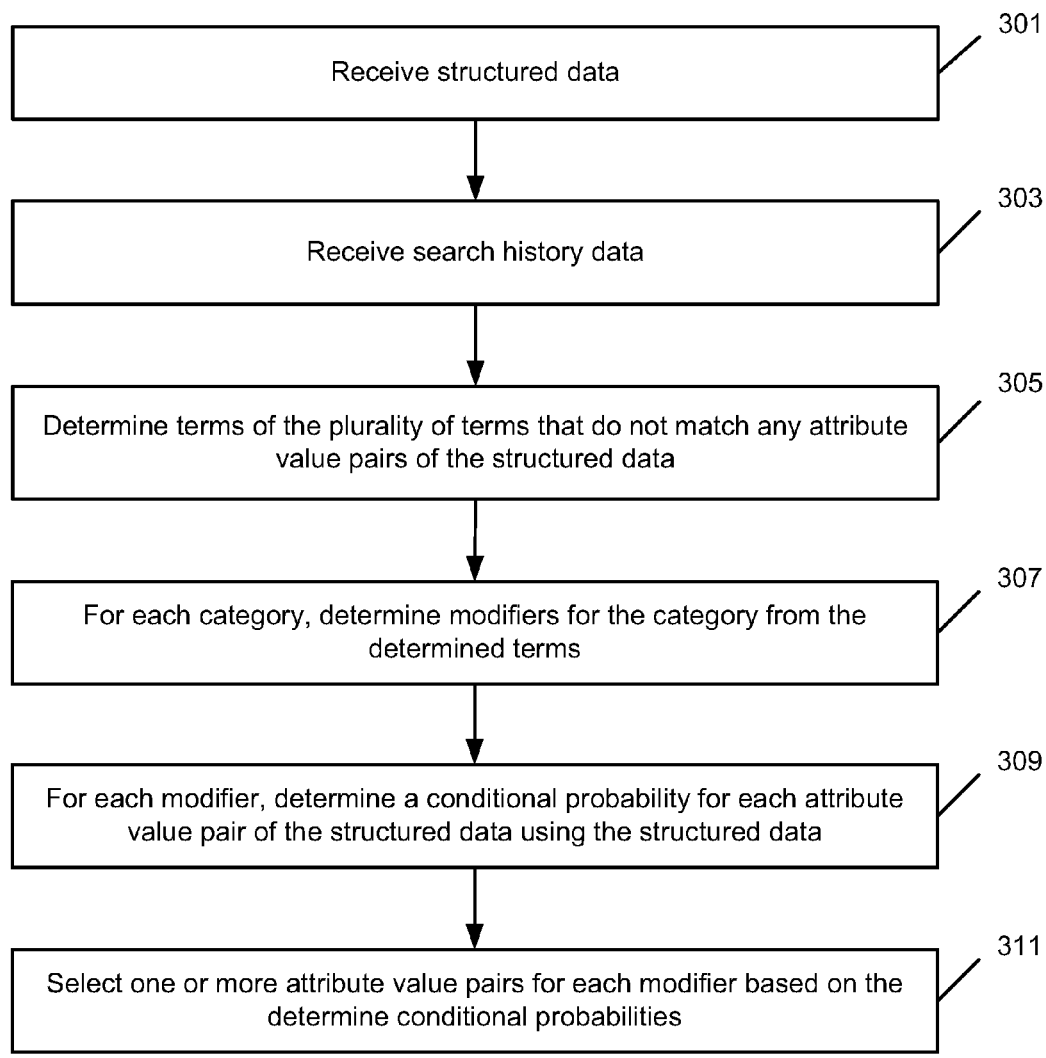
FIG. 3 is an operational flow of an implementation of a method for determining modifiers for query reformulation.

FIG. 3 is an operational flow of an implementation of a method for determining modifiers for query reformulation. The method 300 may be implemented by the reformulation engine 140, for example.

Structured data is received at 301. The structured data 155 may be received by the reformulation engine 140 from one or more providers 160. The structured data 155 may include a plurality of tables and each table may correspond to a particular category. Each row of a table may correspond to an item and each column may correspond to a particular attribute of the item. Each attribute may have one or more values. Each attribute and corresponding value for an item is known as an attribute value pair.

Search history data is received at 303. The search history data 153 may be received by the reformulation engine 140 from the search engine 150. The search history data 153 may include browse trails, and each browse trail may include a query 112 received from a user, and indicators of the web pages and/or domains that the user visited after submitting the query. Each query 112 may include a plurality of terms and may be associated with a category.

Terms of the plurality of terms that do not match any attribute value pairs of the structured data are determined at 305. The terms may be determined by the modifier determiner 210 of the reformulation engine 140. The terms of the queries 112 may that do not match any attribute value pairs of the structured data 155 are known as free tokens.

For each category, modifiers are determined for the category from the determined terms at 307. The modifiers may be determined for each category by the modifier determiner 210. The modifiers may be determined from the determined terms that did not match any attribute value pairs of the structured data 155. In some implementations, the modifiers may be determined by determining an importance score for each term based on the number of different domains or web pages associated the term in the search history data 153 and/or the frequency data 253. In particular, the fewer different domains or web pages associated with a term, the greater the determined importance score for the term. The terms with the highest score for each category may be selected as modifiers for that category by the modifier determiner 210. The determined modifiers for each category may be stored by the modifier determiner 210 with the reformulation data 145.

For each modifier, a conditional probability for each attribute value pair of the structured data is determined at 309. The conditional probabilities may be determined by the attribute value probability determiner 220. The conditional probabilities may be determined using the search history data 153 and are also known as association scores. The conditional probabilities may be stored by the attribute value probability determiner 220 with the reformulation data 145.

One or more attribute values are selected for each modifier at 311. One or more attribute values may be selected for each modifier based on the conditional probabilities and the structured data 155 by the attribute value selector 230 of the reformulation engine 140 by selecting a set of attribute values with a greatest coverage score for each modifier. A coverage score for a set of attribute value pairs is based on a combination of the association scores determined for each of the attribute value pairs with respect to the associated modifier, and the frequency of each of the attribute value pairs in the structured data 155. The selected one or more attribute values for each modifier may be stored by the attribute value selector 230 with the reformulation data 145.

Figure 4:
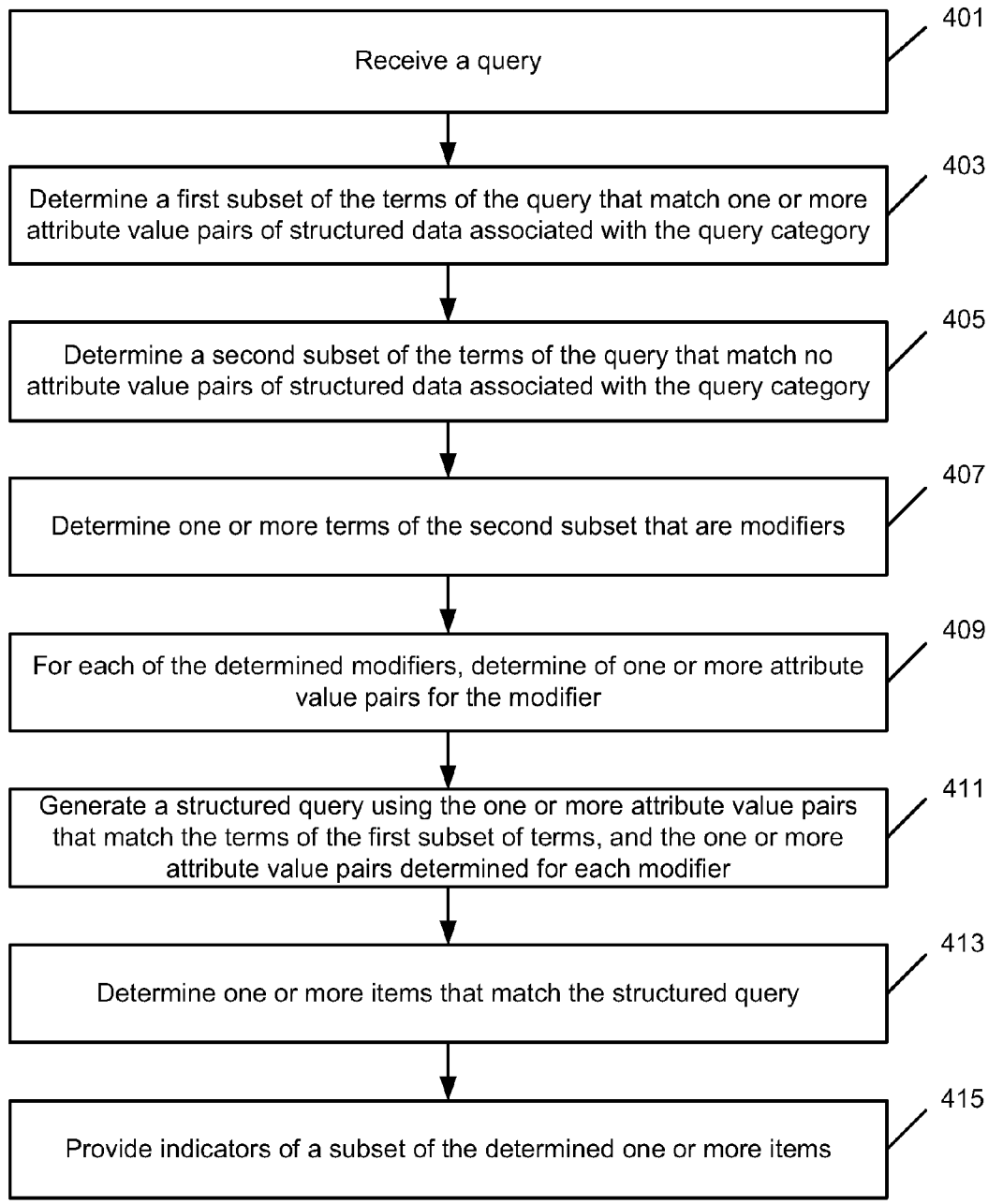
FIG. 4 is an operational flow of an implementation of a method for reformulating a query.

FIG. 4 is an operational flow of an implementation of a method 400 for reformulating a query. The method 400 may be implemented using the reformulation engine 140, for example.

A query is received at 401. The query 112 is received by the reformulation engine 140. The query 112 may be received from one or more of the search engine 150 and/or the provider 160. The query 112 may have been provided to the search engine 150 and/or provider 160 by a user of the client 110. The query 112 may include a plurality of terms and may be associated with one or more categories.

A first subset of terms of the query is determined at 403. The first subset of terms may comprise terms that match attribute value pairs of structured data 155. The structured data 155 may correspond to the same category as the query 112. The matching terms are known as typed tokens, and may be determined by the query reformulator 240 of the reformulation engine 140.

A second subset of terms of the query is determined at 405. The second subset of terms may be terms of the query 112 that do not match any attribute value pairs of the structured data 155. The non-matching terms are known as free tokens, and may be determined by the query reformulator 240 of the reformulation engine 140.

One or more terms of the second subset of terms that are modifiers are determined at 407. The one or more terms of the second subset of terms that are modifiers may be determined by the query reformulator 240 of the reformulation engine 140 using the reformulation data 145. As described previously, the modifier determiner 210 may have determined modifiers for each of a plurality of categories and stored the modifiers in the reformulation data 145. The query reformulator 240 may determine the one or more terms from the second subset of terms that are modifiers by matching the terms from the second set of terms with the determined modifiers for the category associated with the query 112 in the reformulation data 145.

For each of the determined modifiers, one or more attribute values pairs are determined at 409. The one or more attribute value pairs may be determined by the query reformulator 240 of the reformulation engine 140. Each of the modifiers may be associated with one or more attribute values for each category in the reformulation data 145. The query reformulator 240 may determine the one or more attribute value pairs by retrieving the one or more attribute value pairs associated with the determined modifiers for the category associated with the query 112 from the reformulation data 145.

A structured query is generated using the one or more attribute value pairs that match the first subset of terms and the one or more attribute value pairs determined for each modifier at 411. The structured query may be the reformulated query 115 and may be generated by the query reformulator 240 of the reformulation engine 140.

One or more items that match the structured query are determined at 413. The one or more items that match the query may be determined by the reformulation engine 140 by matching the structured query against the structured data 155. Alternatively or additionally, the reformulation engine 140 may provide the structured query to the search engine 150 and/or the provider 160 and either of them may match the structured query against the structured data 155. The items may include any one of a variety of items, entities, products or services with characteristics that may be represented by the structured data 155.

Indicators of a subset of the determined one or more items are provided at 415. The indicators may be provided by one or more of the reformulation engine 140, search engine 150, or provider 160. The indicators may be presented to the client 110 that originated the query 112 as the results 130. The results 130 may be a web page, for example.

Figure 5:
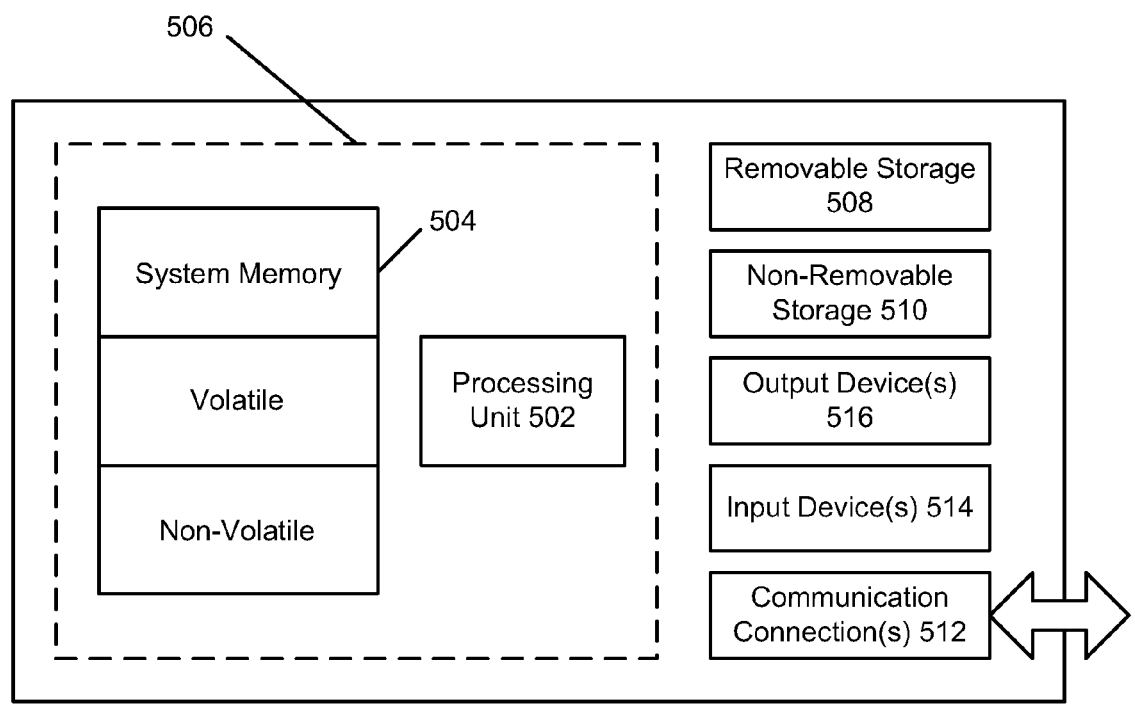
FIG. 5 shows an exemplary computing environment in which example embodiments and aspects may be implemented.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing system 500. In its most basic configuration, computing system 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing system 500 may have additional features/functionality. For example, computing system 500 may include additional storage (removable and/or non-removable) including, but not limited to, magnetic or optical disks or tape. Such additional storage is illustrated in FIG. 5 by removable storage 508 and non-removable storage 510.

Computing system 500 typically includes a variety of computer readable media. Computer readable media can be any available media that can be accessed by the system 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 500. Any such computer storage media may be part of computing system 500.

Computing system 500 may contain communications connection(s) 512 that allow the device to communicate with other devices. Computing system 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    receiving a query at a computing device through a network, wherein the query comprises a plurality of terms and is associated with a category;
    determining a first subset of terms of the plurality of terms that match one or more attribute value pairs from structured data associated with the category by the computing device;
    determining a second subset of terms of the plurality of terms that do not match any attribute value pairs from the structured data associated with the category by the computing device;
    determining one or more modifiers for the category from the terms of the second subset of terms by the computing device, comprising determining an importance score for each of the terms of the second subset of terms based on a number of different domains associated with the term in at least one of search history data and frequency data, and selecting as the one or more modifiers for the category those terms with the highest importance score;

for each of the determined modifiers, determining one or more attribute value pairs from the structured data for the modifier by the computing device;

generating a structured query using the one or more attribute value pairs that match the terms of the first subset of terms and the one or more attribute value pairs determined for each modifier by the computing device;

identifying one or more items that match the structured query by the computing device; and presenting a subset of the one or more identified items by the computing device through the network.

2. The method of claim 1, wherein the subset of the one or more identified items is presented in a web page.

3. The method of claim 1, wherein the query is a structured data query.

4. The method of claim 1, further comprising determining the category associated with the query based on the terms of the query.

5. The method of claim 1, wherein determining one or more attribute value pairs for the modifier comprises:
   determining an association score for each attribute value pair with respect to the modifier; and
   determining one or more attribute value pairs for the modifier based on determined association scores.

6. The method of claim 5, wherein determining the association score for an attribute value pair with respect to the modifier comprises:
   retrieving search history data; and
   determining the association score using the search history data.

7. The method of claim 6, wherein the search history data comprises browse trails.

8. A method comprising:
   receiving structured data by a computing device, wherein the structured data comprises a plurality of attribute value pairs;
   receiving search history data by the computing device, wherein the search history data comprises a plurality of queries, wherein each query comprises a plurality of terms and is associated with a category of a plurality of categories, and further wherein each query in the search history data is further associated with one or more domains;
   determining terms of the plurality of terms of each query that do not match any attribute value pairs of the structured data by the computing device;
   for each category, determining modifiers for the category using the search history data and the terms of the plurality of terms of each query that do not match any attribute value pairs by the computing device, comprising determining an importance score for each of the terms of the plurality of terms of each query that do not match any attribute value pairs based on a number of different domains associated with the term in at least one of the search history data and frequency data, and selecting as the one or more modifiers for the category those terms with the highest importance score;
   for each modifier, determining a conditional probability for each attribute value pair of the structured data with respect to the modifier using the search history data by the computing device; and
   selecting one or more attribute value pairs of the structured data for each modifier based on the determined conditional probabilities by the computing device.

9. The method of claim 8, wherein each of the plurality of attribute value pairs of the structured data is associated with a category, and further comprising:
   receiving a query;
   determining a first subset of terms of the plurality of terms of the received query that match one or more attribute value pairs from the structured data associated with the category of the received query;
   determining a second subset of terms of the plurality of terms that do not match any attribute value pairs from the structured data associated with the category of the received query;
   determining one or more terms of the second subset of terms that match one or more of the determined modifiers for the category of received query;
   generating a structured query using the one or more attribute value pairs that match the terms of the first subset of terms, and the selected one or more attribute value pairs of the one or more modifiers that match the determined one or more terms of the second subset of terms;
   identifying one or more items that match the structured query; and
   presenting a subset of the one or more identified items.

10. The method of claim 9, wherein the subset of the one or more identified products is presented in a web page.

11. The method of claim 9, wherein the items comprise one or more of consumer products and services.

12. The method of claim 8, wherein the search history data comprises browse trails.

13. The method of claim 8, wherein determining the importance score for each term comprises:
    for each domain, determining a count of the number of times that a query that includes the term is associated with the domain; and
    determining the importance score for the term based on the determined counts.

14. The method of claim 8, wherein selecting one or more attribute value pairs of the structured data for each modifier based on the determined conditional probabilities further comprises selecting one or more attribute value pairs of the structured data for each modifier based on the determined conditional probabilities and a frequency of each attribute value pair in the structured data.

15. The method of claim 14, wherein selecting one or more attribute value pairs of the structured data for each modifier based on the determined conditional probabilities and the frequency of each attribute value pair in the structured data, further comprises weighting each conditional probability using the frequency of the attribute value pair associated with the conditional probability, and selecting one or more attribute values using the weighted conditional probabilities.

16. A system comprising:
    at least one computing device; and
    a reformulation engine adapted to:
       receive a plurality of browse trails, wherein each browse trail comprises a query, wherein each query comprises a plurality of terms and is associated with a category of a plurality of categories, and further wherein each browse trail is further associated with one or more domains;

determine terms of the plurality of terms of each query that do not match any attribute value pairs of a plurality of attribute value pairs of structured data;

for each category, determine modifiers for the category using the browse trails and the terms of the plurality of terms of each query that do not match any attribute value pairs, comprising determining an importance score for each of the terms of the plurality of terms of each query that do not match any attribute value pairs based on a number of different domains associated with the term in at least one of search history data and frequency data, and selecting as the one or more modifiers for the category those terms with the highest importance score;

for each modifier, determine a conditional probability for each attribute value pair of the structured data with respect to the modifier using the browse trails; and select one or more attribute value pairs of the structured data for each modifier based on the determined conditional probabilities and a frequency of each attribute value pair in the structured data.

17. The system of claim 16, wherein the reformulation engine adapted to determine the importance score for each term comprises the reformulation engine adapted to:
 for each domain, determine a count of the number of times that a query that includes the term is included in a browse trail that is associated with the domain; and
 determine the importance score for the term based on the determined counts.

18. The system of claim 16, wherein the reformulation engine adapted to select one or more attribute value pairs of the structured data for each modifier based on the determined conditional probabilities and the frequency of each attribute value pair in the structured data, further comprises the reformulation engine adapted to weight each conditional probability using the frequency of the attribute value pair associated with the conditional probability, and select one or more attribute values using the weighted conditional probabilities.

* * * * *